(12) United States Patent
Tang et al.

(10) Patent No.: US 7,535,476 B2
(45) Date of Patent: May 19, 2009

(54) METHOD AND SYSTEM COLOR LOOK-UP TABLE (CLUT) RANDOM ACCESS MEMORY ARRANGEMENT FOR CLUT AND GAMMA CORRECTION APPLICATION

(75) Inventors: Chengfuh Jeffrey Tang, Saratoga, CA (US); Yao-Hua Steven Tseng, Fremont, CA (US); Hsien-Chih Jim Tseng, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 91 days.

(21) Appl. No.: 10/640,666

(22) Filed: Aug. 14, 2003

(65) Prior Publication Data

US 2005/0035975 A1   Feb. 17, 2005

(51) Int. Cl.
*G09G 5/02* (2006.01)
(52) U.S. Cl. .................. 345/602; 345/581; 345/601
(58) Field of Classification Search ............. 345/602, 345/589, 601, 581; 348/458, 578; 358/1.15
See application file for complete search history.

(56) References Cited

U.S. PATENT DOCUMENTS

| | | | | |
|---|---|---|---|---|
| 5,227,863 A | * | 7/1993 | Bilbrey et al. | 348/578 |
| 5,748,860 A | * | 5/1998 | Shively | 358/1.15 |
| 5,828,415 A | * | 10/1998 | Keating et al. | 348/458 |
| 6,819,331 B2 | * | 11/2004 | Shih et al. | 345/602 |
| 2002/0186223 A1 | * | 12/2002 | Sasaki | 345/589 |

* cited by examiner

*Primary Examiner*—Matthew C Bella
*Assistant Examiner*—Mike Rahmjoo
(74) *Attorney, Agent, or Firm*—Sterne, Kessler, Goldstein & Fox P.L.L.C.

(57) ABSTRACT

Provided is a method and system for performing color look-up table (CLUT) and gamma correction for video pixel data. A system includes a memory configured for storing CLUT parameters and gamma correction parameters therein. Also included is an input matrix coupled to the memory and configured to receive first and second type pixel data. The memory receives the first type pixel as an address to the stored CLUT parameters and receives the second type pixel data as an address to the stored gamma correction parameters.

14 Claims, 3 Drawing Sheets

METHOD AND SYSTEM COLOR LOOK-UP TABLE (CLUT) RANDOM ACCESS MEMORY ARRANGEMENT FOR CLUT AND GAMMA CORRECTION APPLICATION

BACKGROUND OF THE INVENTION

1. Field of the Invention

The present invention generally relates to RAM memory arrangements for accommodating color look-up tables (CLUTs) and gamma functions.

2. Related Art

A color look-up table (CLUT) is a stored graphics function that permits the use of an 8-bit pixel word as a memory index address. This 8-bit pixel word address, which is representative of a maximum of 256 video display colors, is used to produce 32-bit pixel data. The 32-bit pixel data is then used to provide color graphics arrangements. Embedded RAM memory is used in video graphics engines to support CLUT graphic functions.

Gamma correction is a function to facilitate the correction of color components for television (TV) applications. Conventional gamma correction routines require relatively large numbers of separate RAMs to accommodate all of the table lookup features associated with gamma correction. Gamma correction also requires a separate RAM to store a conversion table to avoid complicated division operations. Thus, in conventional graphics engines, a first RAM and associated control mechanisms are required to support gamma correction functions. A second RAM, and associated control mechanisms are required to support CLUT functions. The requirement to have two separate RAMs with corresponding control mechanisms for supporting CLUT and gamma correction consumes or requires critical resources such as physical chip space and power.

What is needed, therefore, is an integrated RAM arrangement that can be used efficiently accommodate both CLUT and gamma correction functions.

BRIEF SUMMARY OF THE INVENTION

Consistent with the principles in the present invention as embodied and broadly described herein, an embodiment of the present invention includes an apparatus including a memory having CLUT parameters and gamma correction parameters stored therein. The apparatus includes an input matrix configured to receive first and second type pixel data. The memory is coupled to the input matrix and configured to associate one of the first and second type pixel data with the stored CLUT parameters and associate the other of the first and second type pixel data with the stored gamma correction parameters.

There are primarily 2 types of graphics image format: the pixel contains all the color component information (e.g. YUV422 or ARGB8888) and the index (e.g. CLUT format). In order to support CLUT format and Gamma-correction function, conventionally two separate RAMs were needed. In the present invention, however, the CLUT function can be combined with the Gamma-Correction function by applying the Gamma-Correction equation on the Look-up-Table.

The present invention provides one RAM for sharing both CLUT and gamma correction functions. More specifically, one RAM arrangement is integrated such that the same RAM can be used for CLUT+Gamma-Correction (for CLUT format) or just Gamma-Correction (for other formats). This RAM arrangement provides economies in terms of space savings on integrated circuit (IC) chip. It also provides for a more efficient process to implement CLUT and gamma correction functions. Further, the present invention similarly provides a more efficient software setup that does not require special arrangements or address swapping.

Further features and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and detailed description given below, serve to explain the principles of the invention. In the drawings.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one of skill in the art that the present invention as described below, may be implemented in many different embodiments of hardware, software, firmware, and/or the entities illustrated in the figures. Any actual software code with the specialized, controlled hardware to implement the present invention is not limiting of the present invention. Thus, the operation and behavior of the present invention will be described with the understanding that modifications and variations of the embodiments are possible, given the level of detail presented herein.

Figure 1:
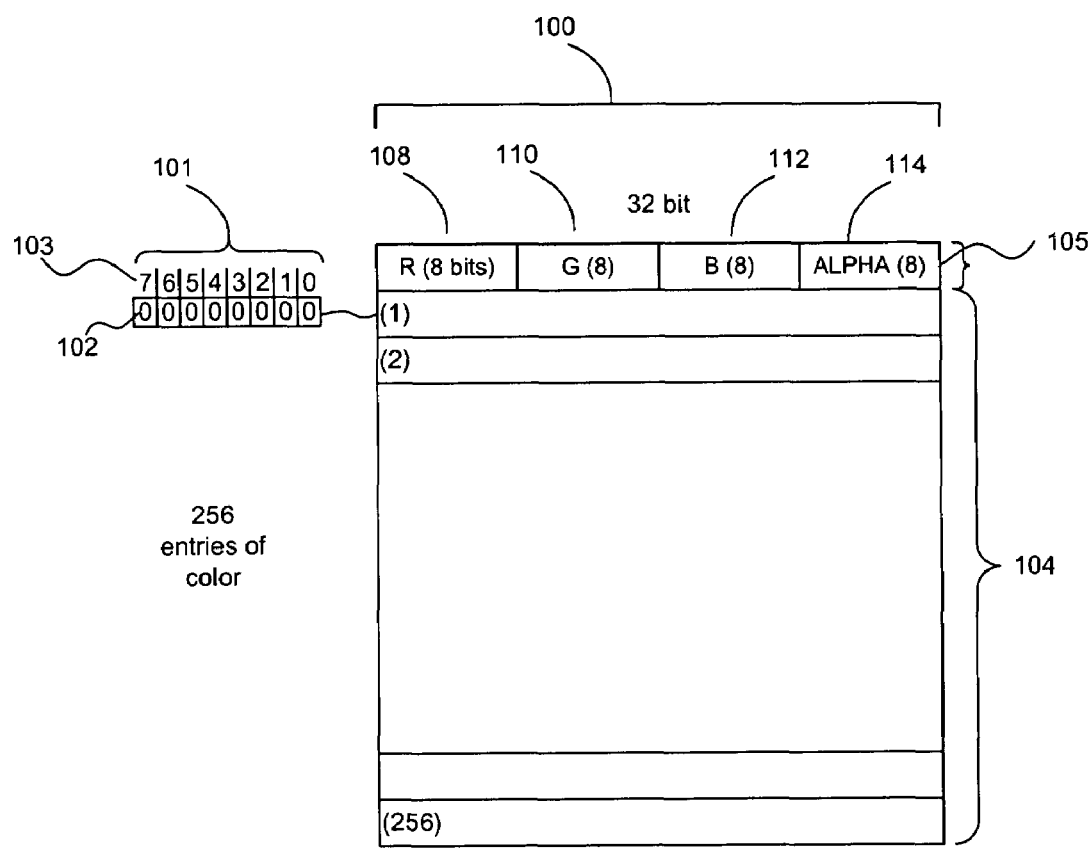
FIG. 1 is an illustration of a RAM implementation of a color lookup table function.

FIG. 1 is a RAM implementation of the CLUT function. In FIG. 1, a RAM 100 is configured to provide CLUT functionality for an 8-bit pixel word 101. The 8-bit pixel word 101 is representative of color data graphics, and includes eight individual bit values 102 at assigned bit locations 103. In an 8-bit pixel word, such as the pixel word 101, each bit value 102 is representative of color information associated with the red, green, blue (RGB) color system. The three colors are combinable to form 256 colors.

Within the 8-bit pixel word 101, three bits, such as the bits in bit locations 5, 6 and 7, are representative of the color red. The bits at locations 2, 3 and 4, are representative of the color green. And the bits in bit-locations 0 and 1 of the pixel word 101, are representative of the color blue. Thus, a videographic system for color display utilizing 8-bit pixel words such as the pixel word 101, are typically limited to the 256 colors.

The purpose of the color lookup table 100 is to expand the 8-bit pixel 101 into a 32-bit pixel word representing an expanded range of colors. That is, through use of the CLUT function, the 8-bit pixel 101 can be indexed to produce 32-bit data representing 256×32 different color combinations. Therefore, the RAM 100 has a dimension of 256×32 bits.

As shown in FIG. 1, the RAM 100 receives 256 entries of color 104 and produces a 32-bit pixel word 105. The 32-bit pixel word 105 includes dedicated 8 bits 108 for red, 8 bits 110 for green, and 8 bits 112 for blue. The remaining 8 alpha bits 114 are used for other purposes.

During operation, a graphics engine (not shown), which is part of a larger video networking system, will receive the 8-bit pixel 101 as an input. The graphics engine will then index the 8-bit pixel 101 as an address to one of the 256 color entries 104 within the RAM 100. The 32-bit data at that address is the 32-bit pixel word 105. The 32-bit pixel word 105 represents more varied colors for use with associated video related functions.

Figure 2:
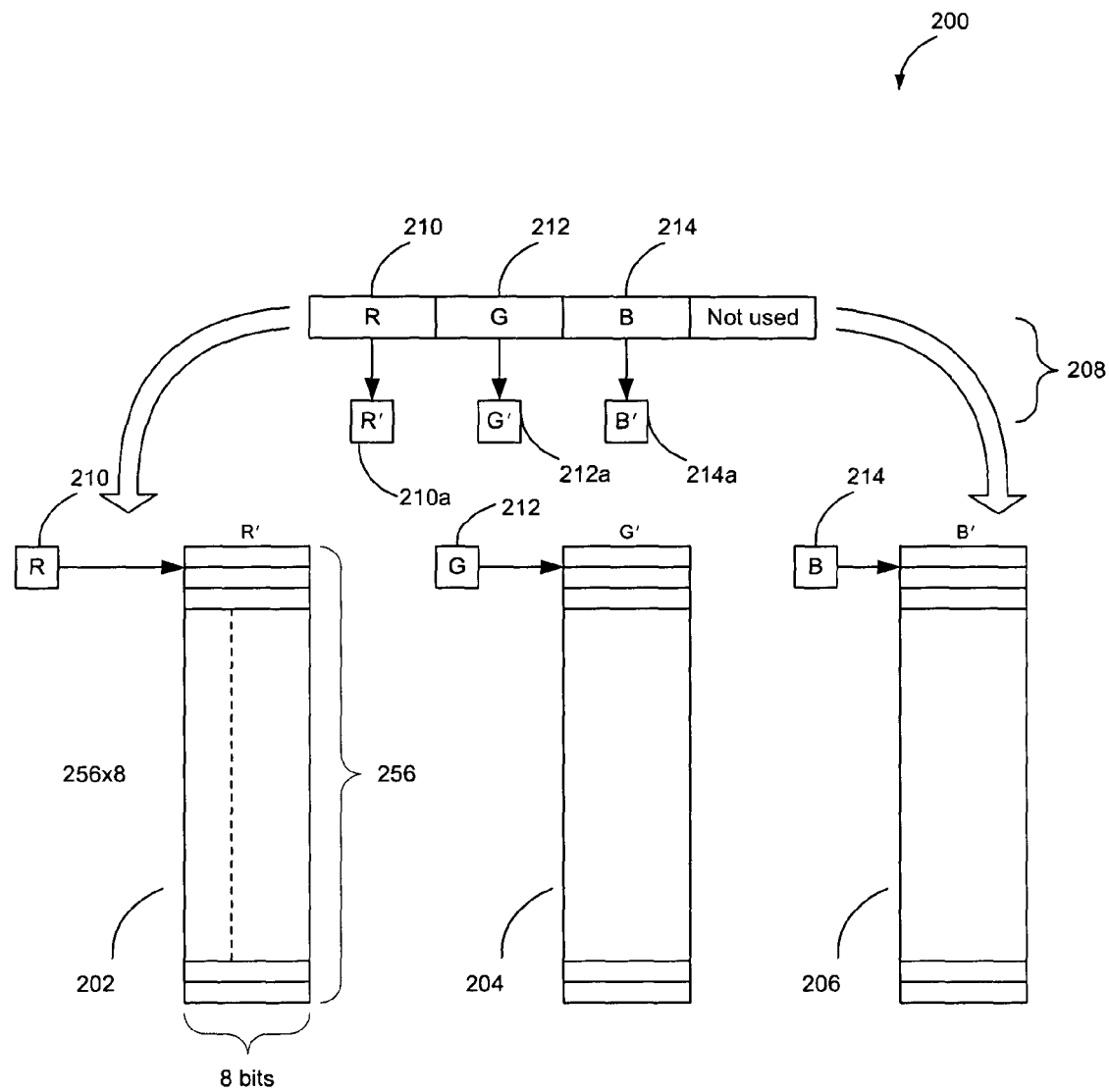
FIG. 2 is a RAM implementation of the gamma correction function.

FIG. 2 is an illustration of a RAM arrangement 200 configured to support gamma correction functions. As noted above, the gamma correction function provides for correction of color components associated with videographics display systems such as TVs. Such degradation is introduced by the transfer characteristic of the CRT (Cathode-Ray Tube) Display. In FIG. 2, a gamma lookup table arrangement 200 includes three separate 256×8 RAMs 202, 204 and 206. The gamma correction arrangement 200 is configured to provide color correction for a color component 208, including 8-bit video color components 210, 212 and 214, which are associated with the RGB color system.

More specifically, the gamma correction arrangement 200 provides for color component correction in accordance with the following gamma-correction equation:

For $R, G, B<0.018, R'=4.5*R, G'=4.5*G,$ and $B'=4.5*B$.

For $R, G, B>=0.018, R'=1.099*R^{0.45}-0.099,$
$G'=1.099*G^{0.45}-0.099, B'=1.099*B^{0.45}-0.099$

Using lookup values stored within the RAMs 202, 204 and 206, the separate color components 210, 212 and 214 are corrected to provide corresponding color components 210a, 212a and 214a. In the example of FIG. 2, the 8-bit color component 210, representing red, is associated with a color component having color deficiencies, such as a defective pixel. In order to correct the deficiencies, the 8-bit component 210 is indexed as an address into the RAM 202. Based upon its corresponding address locations within the RAM 202, the RAM 202 outputs the 8-bit component 210a, or R', which replaces 210 and R respectively. The component 210a contains appropriate corrections based on predetermined look-up table values. The RAMs 204 and 206 contain similar color correction information that is used to index the color components 212 and 214. The indexed components 212 and 214 are used to retrieve corresponding corrected color components 212a and 214a from the RAMs 204 and 206 respectively.

Figure 3:
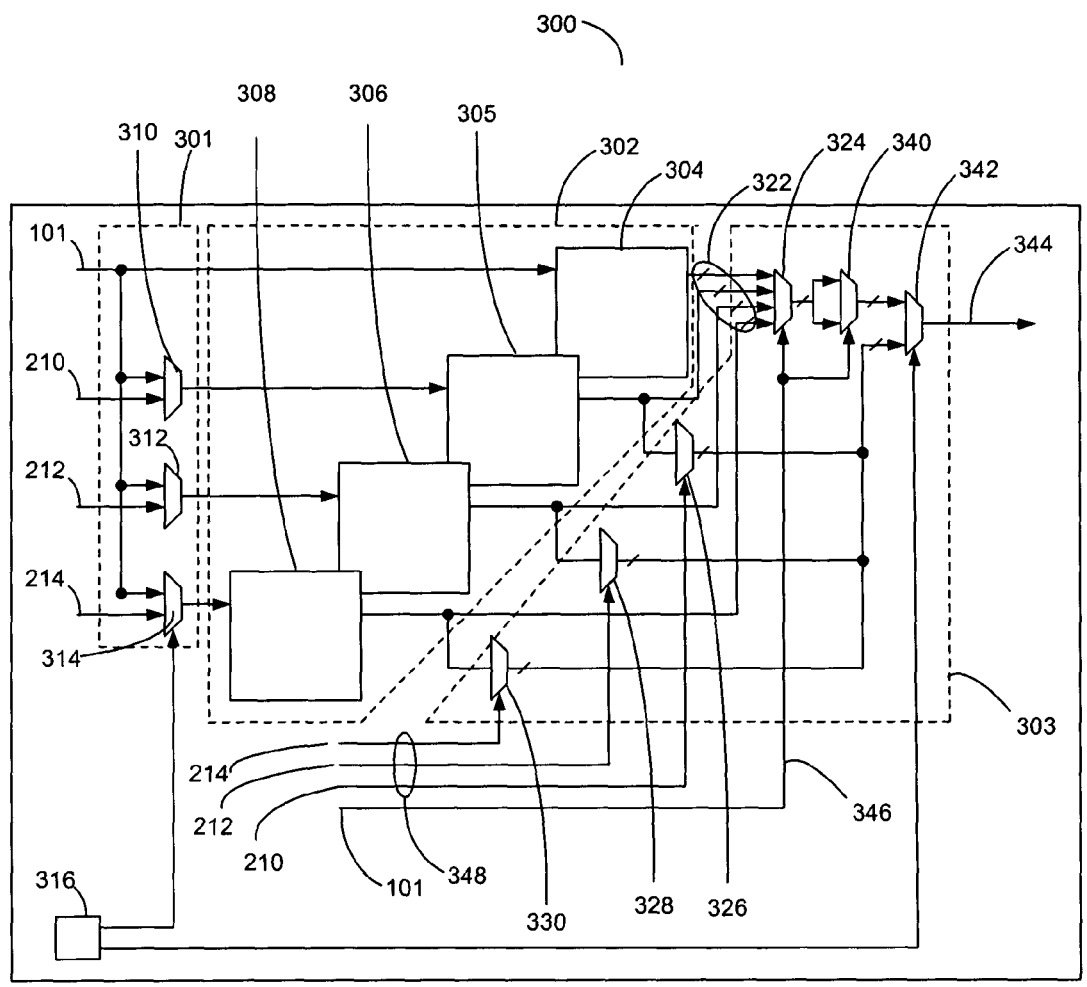
FIG. 3 is a block diagram illustration of a RAM constructed and arranged in accordance with an embodiment of the present invention.

In FIG. 3, an exemplary RAM memory system 300 is configured to perform both CLUT and gamma correction functions, in accordance with the present invention. The RAM memory system 300 includes an input matrix 301, a memory section 302, and an output matrix 303 that are configured to receive the input pixel words 101, 210, 212, and 214 of FIGS. 1 and 2. The memory section 302 includes RAMs 304, 305, 306 and 308. In the example of FIG. 3, the RAMs 304-306 and 308 each have a dimension of 32×64 bits. The present invention is not, however, limited to the example of FIG. 3. The RAM 304 is configured to receive, as an input, the 8-bit pixel word 101. The RAMs 305, 306, and 308 are respectively connected to input multiplexing devices 310, 312 and 314. Although the exemplary embodiment of FIG. 3 provides an illustration using an 8-bit word, in practice the input pixel word can be 8-bits, 4-bits, 2 bits, or some other acceptable bit configuration.

The multiplexing device 310, 312, 314 includes a CLUT/(gamma correction) selection switch 316 to configure the memory system 300 for CLUT mode or gamma correction mode. In CLUT mode the enabling switch 316 control the input matrix 301 to index the pixel word 101 as an address to each of the RAM blocks 304-306 and 308. This address ultimately results in production of a 32-bit pixel value as an output 344 from the memory system 300. In gamma correction mode, the pixel words 210, 212, and 214 are individually provided to RAM blocks 305, 306, and 308, respectively. The pixel words 210, 212, and 214 ultimately result in production of a 24-bit pixel value as the output 344 from the memory system 300.

The output matrix 303 includes a first multiplexing device 324 is configured to receive as inputs respective outputs of RAM blocks 304-306 and 308. The multiplexing device 324 can be implemented, for example, as a 4×1 multiplexer. The output matrix 303 also includes multiplexing devices 326, 328, and 330, connected as shown in FIG. 3. An output of the multiplexing device 324 is provided to a multiplexing device 340. Finally, a multiplexing device 342 receives one input from the multiplexing device 340 and other inputs from the multiplexing devices 326, 328 and 330, to provide an output 344. Operation of the exemplary RAM memory system 300 will be explained in greater detail below.

In the exemplary embodiment of FIG. 3, the memory system 300 is configured in a CLUT mode or a gamma correction mode by providing an appropriate input to the switch 316. By way of example, when configured for CLUT mode, the pixel word 101 is indexed through the input matrix 301 to the RAM blocks 304-306 and 308. More specifically, the most significant bits (MSBs) 3-7, are provided as inputs to one of the respective RAM blocks 304-306 and 308. The specific value represented by the MSBs 3-7 determines which of RAM blocks 304-306 and 308 will be used. This indexing produces a corresponding 32-bit word, such as the pixel word 105 of FIG. 1. The 32-bit pixel word 105 represents the expanded colors derived from the 8-bit word 101.

Four data paths 322, each capable of providing 32 bit data, are coupled to the multiplexing device 324. When the pixel word 101 is provided as an input to the input matrix 301, the multiplexing device 324 is controlled by a control signal 346 to cause the multiplexing device 324 to output one of the four data paths 322. It is also provided along a data path 346. Only one of the four data paths 322 are selected, since only one of the RAM blocks 304-306, and 308 was indexed as an address by the 8-bit pixel word 101. The data from the selected path of the paths 322 is provided as an output from the device 324.

The control signal 346 can be generated from the pixel word 101. For example, bits of the pixel word 101, such as the bits 1 and 2, can be used to select one of the data paths 322 from the RAM blocks 304-306 and 308. While bits 1 and 2 of the pixel word 101 are used to select a particular one of the data paths 322, a remaining bit of the pixel word 101, such as bit 0, is provided as an input to the multiplexing device 340 along the data path 346. The multiplexing device 340 permits selection of the desired 32-bits of data output from the multiplexing device 324.

Alternatively, the user can configure the RAM memory system 300 for the gamma correction mode using the switch 316. When configured for the gamma correction mode, individual color components 210, 212, and 214 of FIG. 2 are provided as inputs to respective multiplexing devices 310, 312, and 314. The example of FIG. 2 associates the color components 210, 212 and 214 with the RGB color system. Alternatively or additionally, luminance and chrominance components (YUV) can be used as inputs.

As in the case with the pixel word 101, selected bits, such as the MSBs 3-7 of each of the components 210, 212 and 214, are used as the inputs to the RAM blocks 305, 306, and 308. At the same time, the color components 210, 212, and 214 (associated with gamma correction) are provided along data lines 348 as inputs to respective multiplexing devices 326, 328, and 330. The multiplexing devices 326, 328, and 330 can be implemented as 8 to 1 multiplexers.

When the system 300 is configured for gamma correction, the multiplexing devices 326, 328, and 330 are configured to select a desired 8-bits from within the data output from the respective RAM blocks 305, 306, and 308. The selected 8-bits are the gamma corrected color components that correspond to the pixels 210, 212, and 214. As shown in FIG. 3, the multiplexing device 324 and 340 are not used during gamma correction.

The respective outputs of the multiplexing devices 326, 328, and 330 are provided to the multiplexing device 342. Thus, the multiplexing device 342 receives either the 32-bit word data associated with the CLUT mode or a 24-bit word data associated with the three combined 8-bit gamma corrected outputs. The multiplexing device 342 provides the 32-bit data or the 24-bit data as an output based upon a signal received from the CLUT/(gamma correction) selection switch 316. The output 344, therefore, includes CLUT data or gamma corrected data.

Thus, the present invention as illustrated in the exemplary embodiment of FIG. 3, provides color lookup function and gamma correction using the same RAM memory system 300. More specifically, 8-bit or other similar pixel data can be used as index addresses to retrieve 32-bit or 24-bit pixel values from the RAM memory system 300 for CLUT or gamma correction. In this manner, an integrated RAM system can be used to accommodate both CLUT and gamma correction functions providing significant economies in terms of space savings, functionality, and software setup.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by analog and/or digital circuits, discrete components, application-specific integrated circuits, firmware, processors executing appropriate software, and the like, or any combination thereof. Thus, the breadth and scope of the present invention should not be limited by any of the above-described exemplary embodiments, but should be defined only in accordance with the following claims and their equivalents.

What is claimed is:

1. An apparatus, comprising:
an input matrix configured to receive first type pixel index data and second type color component data words as inputs;
memory units coupled to the input matrix configured to store both color look-up table (CLUT) parameters and gamma correction parameters;
wherein all of the memory units receive one first type pixel index data word as an address to the stored CLUT parameters; and wherein two or more of the memory units each receives a respective second type color component data word to retrieve the stored gamma correction parameters; and
an output matrix coupled to the memory and configured to produce a single output representative of one from a group including expanded CLUT data and gamma corrected data wherein said output matrix includes a multiplexing device configured to receive as inputs respective outputs of said memory units;
wherein the output matrix is configured to receive as a direct input the first type pixel index data word.

2. The apparatus of claim 1, wherein the memory units include random access memory (RAM) segments.

3. The apparatus of claim 1, wherein the input matrix includes a number of multiplexers.

4. An apparatus, comprising:
an input matrix having a number of output ports and being configured to receive first and second type data as inputs; and
memory units having respective input ports respectively coupled to the output ports of the input matrix, the memory units being configured to store first parameters at first memory locations and second parameters at second memory locations;
wherein one of the first type pixel index data is indexed to all of the first memory locations such that the first type data is read out as a first signal on a multiplexed output line;
wherein a plurality of the second type color component data are respectively indexed to corresponding second memory locations such that the second type data is read out as a second signal on the multiplexed output line;
wherein said multiplexed output line is controlled by a multiplexing device configured to receive as inputs respective outputs of said memory units; and
wherein the multiplexing device is configured to receive as a direct input the first type pixel index data.

5. The apparatus of claim 4, wherein the first parameters include color look-up table (CLUT) parameters and the second parameters include gamma correction parameters.

6. The apparatus of claim 4, wherein the first type pixel index data and second type color component data include video data.

7. The apparatus of claim 4, wherein the input matrix includes a plurality of switching devices, each configured to receive the first type pixel index data at a first input terminal and the second type color component data at a second input terminal, the switching devices having output terminals forming the input matrix output ports.

8. The apparatus of claim 7, wherein the switching devices are multiplexers.

9. The apparatus of claim 4, wherein the memory units include a number of interconnected memory segments.

10. The apparatus of claim 9, wherein the interconnected memory segments comprise random access memories (RAMs).

11. The apparatus of claim 10, wherein the RAMs have a dimension of 32×64 bits.

12. The apparatus of claim 4, wherein the first type pixel index data is received at one time and the second type color component data are received at another time.

13. The apparatus of claim 12, wherein a user determines a time when the first type pixel index data and second type color component data are received.

14. An apparatus, comprising:
a memory configured to store both color look-up table (CLUT) parameters and gamma correction parameters;

wherein the memory receives first type pixel index data as an address to the stored CLUT parameters and receives a plurality of second type color component data as an address to the stored gamma correction parameters;

wherein the stored CLUT and gamma correction parameters, addressed to the first type pixel index data and the second type color component data respectively, are read out on a multiplexed output line controlled by a multiplexing device configured to receive as inputs respective outputs of said memory, the multiplexing device is configured to receive as a direct input the first type pixel index data; and wherein the first type pixel index data includes (X) number of bits and is expandable to represent (X)(N) bits of color data, where N is an integer greater than 1.

* * * * *